(12) United States Patent
Fukuda et al.

(10) Patent No.: US 10,240,952 B2
(45) Date of Patent: Mar. 26, 2019

(54) ROTARY ENCODER

(71) Applicant: FANUC CORPORATION, Yamanashi (JP)

(72) Inventors: Masao Fukuda, Yamanashi (JP); Nobuyuki Ootake, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/914,332

(22) Filed: Mar. 7, 2018

(65) Prior Publication Data
US 2018/0259369 A1 Sep. 13, 2018

(30) Foreign Application Priority Data

Mar. 10, 2017 (JP) .................................. 2017-045772

(51) Int. Cl.
*G01D 5/347* (2006.01)

(52) U.S. Cl.
CPC ....... *G01D 5/3473* (2013.01); *G01D 5/34707* (2013.01)

(58) Field of Classification Search
CPC .................. G01D 5/34707; G01D 5/3473
USPC ................................................ 250/221, 239
See application file for complete search history.

(56) References Cited

U.S. PATENT DOCUMENTS

| | | | | |
|---|---|---|---|---|
| 4,894,533 A | * | 1/1990 | Abe | .................. G01D 5/34707 250/229 |
| 6,255,644 B1 | | 7/2001 | Taniguchi et al. | |
| 2005/0141664 A1 | | 6/2005 | Braun | |

FOREIGN PATENT DOCUMENTS

| | | |
|---|---|---|
| JP | H11-014404 A | 1/1999 |
| JP | 2002-357409 A | 12/2002 |
| JP | 2012-163361 A | 8/2012 |
| JP | 5014512 B2 | 8/2012 |

OTHER PUBLICATIONS

An Office Action; "Notification of Reasons for Refusal," mailed by the Japanese Patent Office dated Jun. 12, 2018, which corresponds to Japanese Patent Application No. 2017-045772 and is related to U.S. Appl. No. 15/914,332; with partial English language translation.

An Office Action mailed by the State Intellectual Property Office of the People's Republic of China dated Dec. 14, 2018, which corresponds to Chinese Patent Application No. 201810191602.8 and is related to U.S. Appl. No. 15/914,332.

* cited by examiner

*Primary Examiner* — Que Tan Le
(74) *Attorney, Agent, or Firm* — Studebaker & Brackett PC

(57) ABSTRACT

A rotary encoder is for detecting the rotation position or rotation speed of a shaft. The rotary encoder includes: a rotation code plate having a detection code and to be rotated by the shaft; and a boss attached to the rotation center of the rotation code plate and used for attaching the rotation code plate to the shaft. The boss is made of a resin material. The boss includes a fitting hole formed at the rotation center of the boss and used for making a fit with the shaft through press-fitting.

4 Claims, 9 Drawing Sheets

ROTARY ENCODER

This application is based on and claims the benefit of priority from Japanese Patent Application No. 2017-045772, filed on 10 Mar. 2017, the content of which is incorporated herein by reference.

BACKGROUND OF THE INVENTION

Field of the Invention

The present invention relates to a rotary encoder for detecting the rotation position or rotation speed of a shaft (rotation axis) of a servo motor, for example.

Related Art

There has been a known rotary encoder attached to a shaft of a servo motor used in NC machine tools, robots, or various industrial machines, for example, and used for detecting the rotation position or rotation speed of the shaft.

Such a rotary encoder includes an optical rotary encoder with a rotation code plate, a light-emitting unit, and a light-sensitive unit. The rotation code plate has a detection code, and is rotated while being attached to the shaft. The light-emitting unit emits light to the detection code at the rotation code plate. The light-sensitive unit receives light having been transmitted through or reflected from the detection code at the rotation code plate and performs photoelectric conversion on the received light, thereby generating a pulsed electrical signal. Then, the light-sensitive unit detects the rotation position or rotation speed of the shaft based on the pulsed electrical signal.

In such a rotary encoder, to increase detection accuracy, it is important to reduce shift (decentering) between the rotation center of the detection code at the rotation code plate and the rotation center of the shaft by arranging the positions of these rotation centers (what is called centering) (see patent documents 1 and 2, for example).

A procedure of centering of a rotation code plate in a conventional rotary encoder will be described below by referring to FIGS. 11A and 11B. In this conventional example, the rotation code plate is attached to a shaft with a metallic boss and centering is performed twice. FIGS. 11A and 11B show the procedure of assembling a rotation unit (including the rotation code plate and the boss) in the conventional rotary encoder. The assembly procedure shown in FIG. 11A includes a first centering step for reducing decentering of the rotation code plate relative to the boss. The assembly procedure shown in FIG. 11B includes a second centering step for reducing decentering of the boss relative to the shaft.

First, a boss 20X is attached to a rotation code plate 10X. More specifically, as shown in FIG. 11A, a temporary shaft 2X is inserted into a hole 23X at the boss 20X to fix the boss 20X to the temporary shaft 2X. Then, the rotation code plate 10X is fixed temporarily to the boss 20X from above with an adhesive member (arrow A). Next, the temporary shaft 2X is rotated (arrow B1). At this time, force is applied to the outer periphery of the rotation code plate 10X to move the rotation code plate 10X (arrows B2), by using an optical instrument (corresponding to the above-described light emitting unit and light-sensitive unit) so as to reduce the amount of decentering of the rotation center of the detection code at the rotation code plate 10X relative to the rotation center of the boss 20X to a predetermined amount. Then, the adhesive member is cured to fix the rotation code plate 10X to the boss 20X permanently. Further, the rotation code plate 10X and the boss 20X are removed from the temporary shaft 2X.

In this way, the first centering step for reducing decentering of the rotation center of the detection code at the rotation code plate 10X relative to the rotation center of the boss 20X is performed during attachment of the boss 20X to the rotation code plate 10X.

Next, the rotation code plate 10X and the boss 20X are attached to a shaft 2. More specifically, as shown in FIG. 11B, the shaft 2 is inserted into the hole 23X at the boss 20X and a screw 3 is fitted into a screw hole at the shaft 2 through the rotation code plate 10X and the boss 20X, thereby fixing the boss 20X (specifically, rotation code plate 10X) to the shaft 2 temporarily (arrow C).

If the boss 20X is also made of metal in the presence of the metallic shaft 2, the hole 23X at the boss 207 is required to be designed to have a diameter larger than the diameter of the shaft 2. This necessitates additional centering during attachment of the shaft 2 into the hole 23X at the boss 20X. More specifically, the shaft 2 is rotated (arrow D1). At this time, force is applied to the outer periphery of the rotation code plate 10X to move the boss 20X (specifically, the rotation code plate 10X) (arrows D2), by using the optical instrument so as to reduce the amount of decentering of the rotation center of the boss 20X (specifically, the rotation center of the detection code at the rotation code plate 10X) relative to the rotation center of the shaft 2 to a predetermined amount. Then, the boss 20X (specifically, the rotation code plate 10X) is fixed to the shaft 2 permanently with the screw 3.

In this way, the second centering step for reducing decentering of the rotation center of the boss 20X (specifically, the rotation center of the detection code at the rotation code plate 10X) relative to the rotation center of the shaft 2 is performed during attachment of the rotation code plate 10X and the boss 20X to the shaft 2.

Patent Document 1: Japanese Unexamined Patent Application, Publication No. 2002-357409

Patent Document 2: Japanese Patent No. 5014512

SUMMARY OF THE INVENTION

As described above, the conventional example of attaching the rotation code plate 10X to the shaft 2 using the metallic boss 20X necessitates the two centering steps: the first centering step for reducing decentering of the rotation code plate 10X relative to the boss 20X; and the second centering step for reducing decentering of the boss 20X relative to the shaft 2. Hence, many steps (manufacturing steps) have been required for attaching the rotary encoder to the shaft. Additionally, much capital investment has been required for the centering steps.

The present invention is intended to provide a rotary encoder allowing elimination of a centering step for reducing decentering of a rotation code plate relative to a shaft during attachment of the rotary encoder to the shaft.

(1) A rotary encoder according to the present invention (rotary encoder 1, 1A, 1B described later, for example) is for detecting the rotation position or rotation speed of a shaft (shaft 2 described later, for example). The rotary encoder includes: a rotation code plate (rotation code plate 10, 10A, 10B described later, for example) having a detection code (detection code 11 described later, for example) and to be rotated by the shaft; and a boss (boss 20, 20A, 20B described later, for example) attached to the rotation center of the rotation code plate and used for attaching the rotation code plate to the shaft. The boss is made of a resin material. The boss includes a fitting hole (fitting hole 23 described later, for example) formed at the rotation center of the boss and used for making a fit with the shaft through press-fitting.

(2) In the rotary encoder described in (1), the rotation code plate may include a first positioning hole (positioning hole 12 described later, for example) or a first positioning protrusion formed at a position determined relative to the rotation center of the detection code at the rotation code plate. The boss may include a second positioning protrusion (positioning protrusion 24 described later, for example) or a second positioning hole formed at a position determined relative to the rotation center of the boss. The second positioning protrusion may be used for making a fit with the first positioning hole through press-fitting. The second positioning hole may be used for making a fit with the first positioning protrusion through press-fitting.

(3) in the rotary encoder described in (1), the rotation code plate may include a first center hole (center hole 13 described later, for example) or a first center protrusion formed at the rotation center of the detection code at the rotation code plate. The boss may include a second center protrusion (center protrusion 25 described later, for example) to be inserted into the first center hole or a second center hole into which the first center protrusion is to be inserted. The second center protrusion and the second center hole may be formed at the rotation center of the boss. The rotary encoder may further include an alignment member formed in the first center hole and between the rotation code plate and the second center protrusion of the boss or formed in the second center hole and between the first center protrusion of the rotation code plate and the boss. The alignment member may be used for aligning the rotation code plate and the boss.

(4) in the rotary encoder described any one of (1) to (3), the fitting hole may have a diameter smaller than the diameter of the shaft.

(5) In the rotary encoder described in (2), the second positioning protrusion may have a diameter larger than the diameter of the first positioning hole, and the second positioning hole may have a diameter smaller than the diameter of the first positioning protrusion.

The present invention is capable of providing a rotary encoder allowing elimination of a centering step for reducing decentering of a rotation code plate relative to a shaft during attachment of the rotary encoder to the shaft.

DETAILED DESCRIPTION OF THE INVENTION

Figure 1:
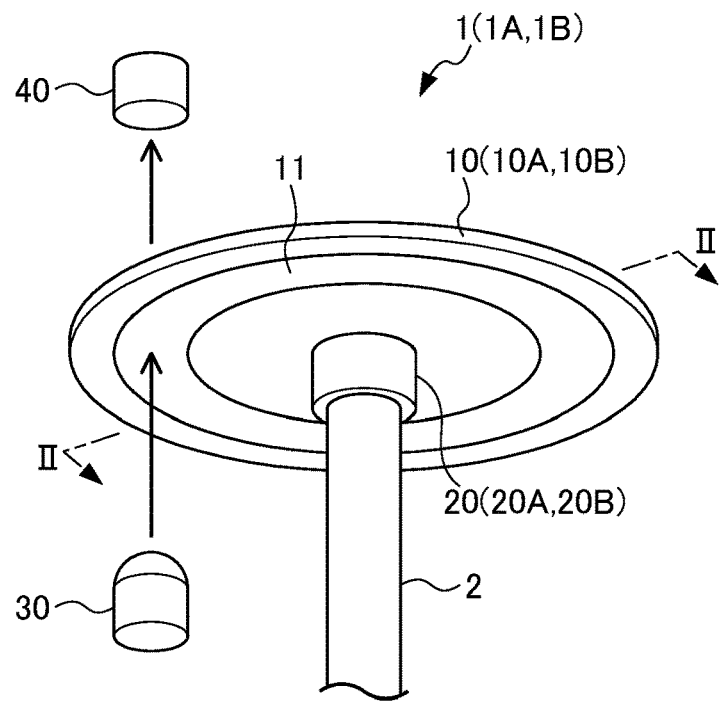
FIG. 1 is a perspective view showing the configuration of a rotary encoder according to an embodiment of the present invention.

Exemplary embodiments of the present invention will be described below by referring to the drawings. Elements common between drawings or comparable elements in drawings will be identified by the same sign.

First Embodiment

Figure 2:
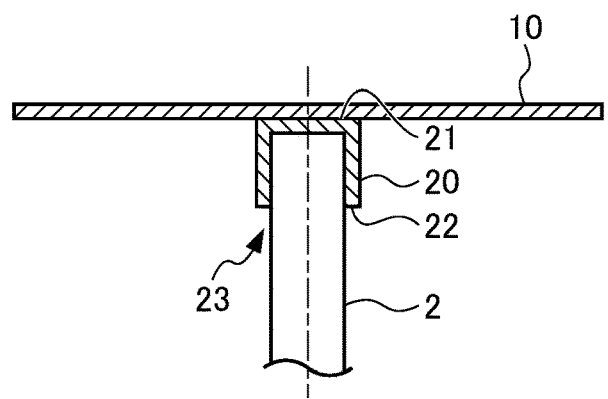
FIG. 2 is a sectional view taken along a line II-II of FIG. 1 and showing a rotation unit in a rotary encoder according to a first embodiment.

FIG. 1 is a perspective view showing the configuration of a rotary encoder according to a first embodiment of the present invention. FIG. 2 is a sectional view taken along a line II-II of FIG. 1 and showing a rotation unit in the rotary encoder according to the first embodiment.

A rotary encoder 1 shown in FIGS. 1 and 2 is attached to a shaft (rotation axis) 2 of a servo motor used in machine tools, for example, and used for detecting the rotation position or rotation speed of the shaft 2. The rotary encoder 1 includes a rotation code plate 10, a boss 20, a light-emitting unit 30, and a light-sensitive unit 40. The rotation code plate 10 and the boss 20 form a rotation unit to be rotated by the shaft 2.

The rotation code plate 10 is made of a material such as metal, glass, or resin, and has a shape like a circular plate. The rotation code plate 10 has a detection code 11 formed at the outer circumferential area of the rotation code plate 10. The detection code 11 includes light-transmitting parts and light-shielding parts arranged alternately in the circumferential direction of the rotation code plate 10.

If the rotation code plate 10 is made of a metallic material without light-transmitting properties, for example, the light-transmitting parts of the detection code 11 are constructed from multiple slit-like holes formed at regular intervals in the circumferential direction of the rotation code plate 10. Further, the light-shielding parts of the detection code 11 are constructed from metallic parts between the slit-like holes.

If the rotation code plate 10 is made of a glass material or a resin material having light-transmitting properties, the light-shielding parts of the detection code 11 are constructed from patterns formed at regular intervals in the circumferential direction of the rotation code plate 10 using a material without light-transmitting properties. Further, the light-transmitting parts of the detection code 11 are constructed from glass parts or resin parts between these patterns.

In this embodiment, the rotation center of the rotation code plate 10 means the rotation center of the detection code 11.

The boss 20 is a member for attaching the rotation code plate 10 to the shaft 2. The boss 20 also has the function of suppressing tilt (plane deflection) of the rotation code plate 10 from the shaft 2.

The boss 20 has a circular columnar shape. The boss 20 has one end 21 formed as a plane. The one end 21 of the boss 20 is attached to the rotation center of the rotation code plate 10 in a first centering step described later so as to reduce decentering of the rotation center of the detection code 11 at the rotation code plate 10 relative to the rotation center of the boss 20.

The boss 20 has an opposite end 22 where a fitting hole 23 for making a fit with the shaft 2 is formed at the rotation center of the boss 20. The fitting hole 23 has a diameter smaller than the diameter of the shaft 2. For example, the diameter of the fitting hole 23 is smaller than the diameter of the shaft 2 by about 0.05 mm.

The boss 20 is made of a resin material. As an example, the resin material is polyetherimide (PEI) resin such as ULTEM (registered trademark). Polyetherimide resin has amorphous thermoplastic properties and is usable for injection molding. As described above, the boss 20 is made of the resin material and the fitting hole 23 has a larger diameter than the shaft 2. This allows the shaft 2 to be fitted into the fitting hole 23 through light press-fitting.

In this embodiment, the rotation center of the boss 20 means the rotation center of the fitting hole 23. The shape of the boss 20 is not limited to the circular columnar shape. For example, the boss 20 may have an elliptical columnar shape or a polygonal columnar shape. Alternatively, the boss 20 may have a circular cylindrical shape, an elliptical cylindrical shape, or a polygonal cylindrical shape with the fitting hole 23 penetrating the boss 20 from the opposite end 22 to the one end 21.

The light-emitting unit 30 includes one or multiple light-emitting elements such as LEDs. The light-emitting unit 30 may include a lens or a reflector for generating parallel rays of light from the light-emitting element. The light-emitting unit 30 emits light to the detection code 11 at the rotation code plate 10.

The light-sensitive unit 40 includes a photoelectric converter such as a photodiode. The light-sensitive unit 40 receives part of light having been emitted from the light-emitting unit 30 and transmitted through the detection code 11 at the rotation code plate 10 and performs photoelectric conversion on the received light, thereby generating a pulsed electrical signal. The light-sensitive unit 40 further includes a signal processing circuit for detecting the rotation position or rotation speed of the shaft 2 based on the pulsed electrical signal.

Figure 3A:
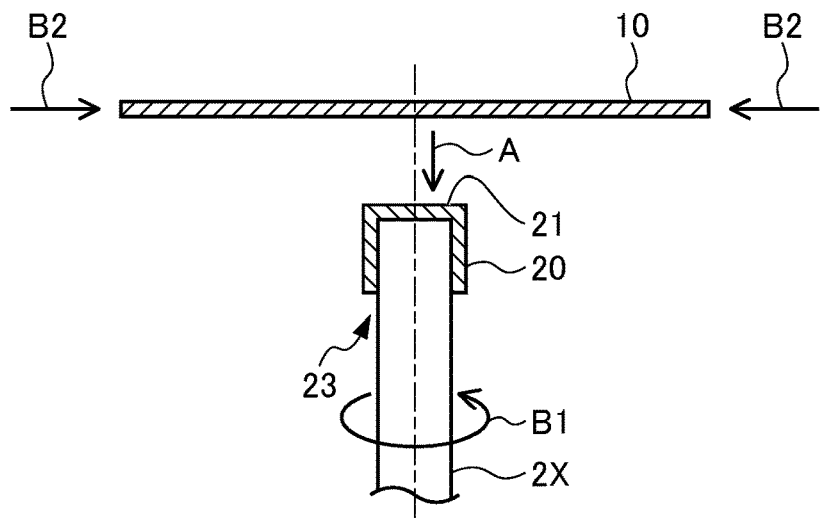
FIG. 3A is a sectional view showing part of a procedure of assembling the rotation unit in the rotary encoder according to the first embodiment.
Figure 3B:
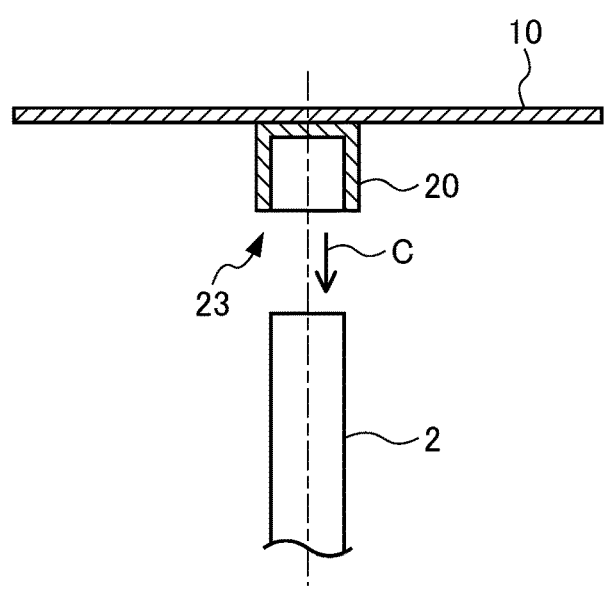
FIG. 3B is a sectional view showing different part of the procedure of assembling the rotation unit in the rotary encoder according to the first embodiment.

A procedure of assembling the rotation unit (including the rotation code plate 10 and the boss 20) in the rotary encoder will be described next by referring to FIGS. 3A and 3B. FIGS. 3A and 3B are sectional views showing the procedure of assembling the rotation unit in the rotary encoder 1 according to the first embodiment.

Figure 11A:
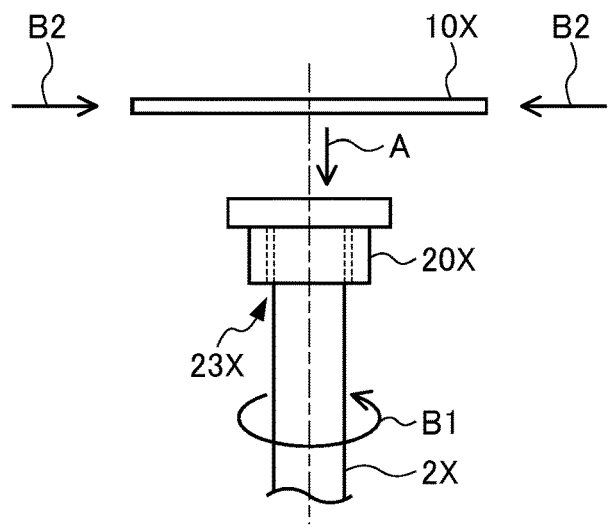
FIG. 11A shows part of a procedure of assembling a rotation unit in a conventional rotary.
Figure 11B:
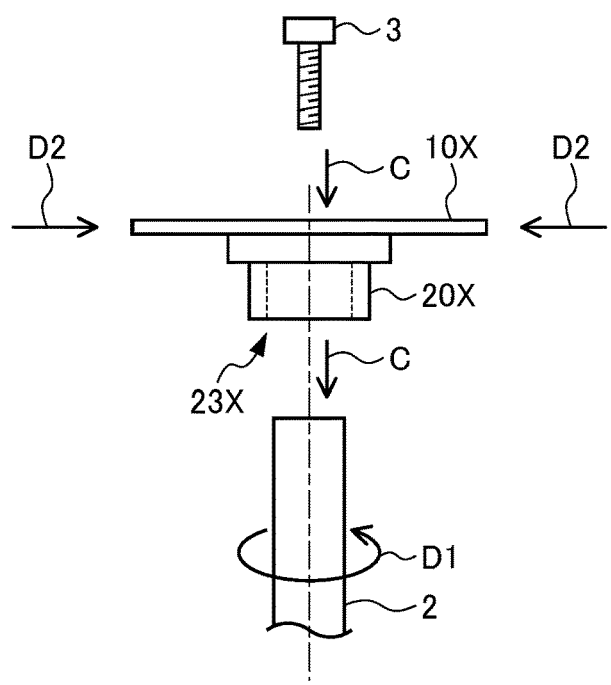
FIG. 11B shows a different part of the procedure of assembling the rotation unit in the conventional rotary encoder.

First, like in the procedure described above by referring to FIG. 11A, the boss 20 is attached to the rotation code plate 10. More specifically, as shown in FIG. 3A, a temporary shaft 2X is inserted into the fitting hole 23 at the boss 20 to fix the boss 20 to the temporary shaft 2X. Then, the rotation code plate 10 is fixed temporarily to the one end 21 of the boss 20 from above with an adhesive member (arrow A). Next, the temporary shaft 2X is rotated (arrow B1). At this time, force is applied to the outer circumference of the rotation code plate 10 to move the rotation code plate 10 (arrows B2), by using an optical instrument (corresponding to the above-described light-emitting unit 30 and light-sensitive unit 40) so as to reduce the amount of decentering of the rotation center of the detection code 11 at the rotation code plate 10 relative to the rotation center of the boss 20 to a predetermined amount. Then, the adhesive member is cured to fix the rotation code plate 10 to the boss 20 permanently. Further, the rotation code plate 10 and the boss 20 are removed from the temporary shaft 2X.

In this way, the first centering step for reducing decentering of the rotation center of the detection code 11 at the rotation code plate 10 relative to the rotation center of the boss 20 is performed during attachment of the boss 20 to the rotation code plate 10.

Next, the rotation code plate 10 and the boss 20 are attached to the shaft 2. More specifically, as shown in FIG. 3B, the shaft 2 is fitted into the fitting hole 23 at the boss 20 through light press-fitting (arrow C). At this time, the boss 20 and the shaft 2 may be adhesively connected with an adhesive member.

As described above, in the rotary encoder 1 of this embodiment, the boss 20 is made of the resin material, and includes the fitting hole 23 formed at the rotation center of the boss 20 for making a fit with the shaft 2 through light press-fitting. Thus, decentering of the rotation center of the boss 20 relative to the rotation center of the shaft 2 can be reduced only by fitting the shaft 2 into the fitting hole 23 at the boss 20 through light press-fitting. This makes it possible to eliminate the need for performing the second centering step for reducing decentering of the rotation center of the boss 20 (specifically, the rotation center of the detection code 11 at the rotation code plate 10 with decentering relative to the rotation center of the boss 20 having been reduced by the first centering step) relative to the rotation center of the shaft 2 during attachment of the boss 20 to the shaft 2.

Second Embodiment

In the first embodiment, the second centering step for centering of the boss 20 relative to the shaft 2 is eliminated during attachment of the boss 20 to the shaft 2. In the first embodiment, however, the first centering step for centering of the rotation code plate 10 relative to the boss 20 is required during attachment of the boss 20 to the rotation code late 10. A second embodiment is to further eliminate the first centering step.

Referring to FIG. 1, the second embodiment differs from the first embodiment in that a rotary encoder 1A according to the second embodiment includes a rotation code plate 10A and a boss 20A instead of the rotation code plate 10 and the boss 20 in the rotary encoder 1.

Figure 4:
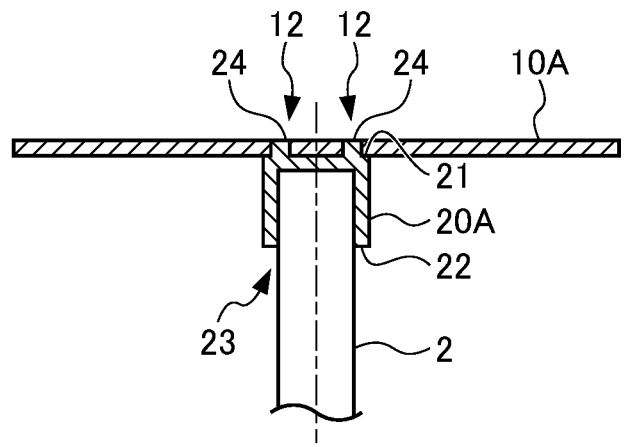
FIG. 4 is a sectional view taken along the line II-II of FIG. 1 and showing a rotation unit in a rotary encoder according to a second embodiment.
Figure 5A:
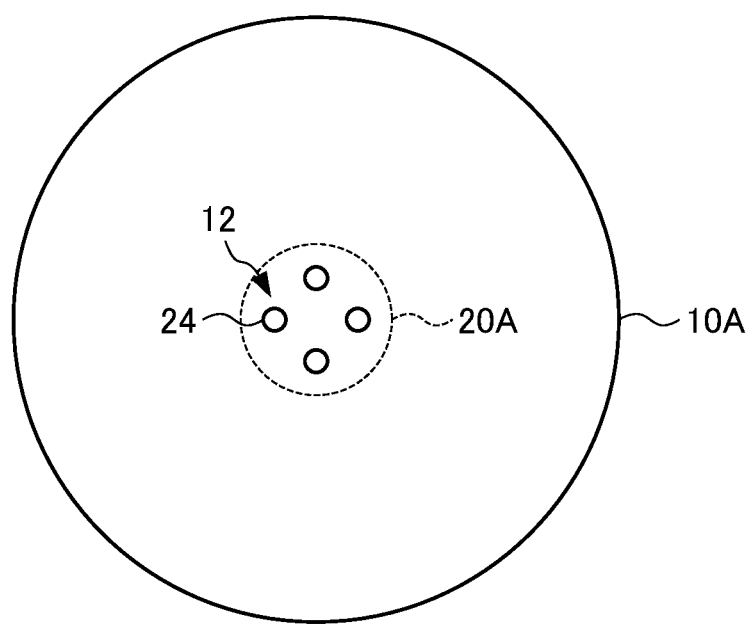
FIG. 5A shows the rotation unit in the rotary encoder according to the second embodiment viewed from the direction of a rotation code plate.

FIG. 4 is a sectional view taken along the line II-II of FIG. 1 and shows a rotation unit (including the rotation code plate 10A and the boss 20A) in the rotary encoder 1A according to the second embodiment. FIG. 5A shows the rotation unit in the rotary encoder 1A according to the second embodiment viewed from the direction of the rotation code plate 10A.

The rotation code plate 10A differs from the rotation code plate 10 of the first embodiment shown in FIG. 2 in that the rotation code plate 10A includes a positioning hole (first positioning hole) 12 formed at a highly accurately determined position relative to the rotation center of the rotation code plate 10A. In this embodiment, the rotation code plate 10A includes four positioning holes 12 formed at substantially regular intervals in a circle substantially concentric with the rotation center of the rotation code plate 10A. As long as the positioning holes 12 are formed at highly accurately determined positions relative to the rotation center of the rotation code plate 10A, the positioning holes 12 are not always required to be arranged in a circle concentric with the rotation center of the rotation code plate 10A or are not always required to be arranged at regular intervals.

The boss 20A differs from the boss 20 of the first embodiment shown in FIG. 2 in that the one end 21 of the boss 20A is provided with a positioning protrusion (second positioning protrusion) 24 formed at a highly accurately determined position relative to the rotation center of the boss 20A for making a fit with the positioning hole 12 at the rotation code plate 10A. In this embodiment, the boss 20A includes four positioning protrusions 24 formed at substantially regular intervals in a circle substantially concentric with the rotation center of the boss 20A. As long as the positioning protrusions 24 are formed at highly accurately determined positions relative to the rotation center of the boss 20A, the positioning protrusions 24 are not always required to be arranged in a circle concentric with the rotation center of the boss 20A or are not always required to be arranged at regular intervals.

The positioning protrusions 24 have a diameter same as the diameter of the positioning holes 12 or more. For example, the diameter of the positioning protrusions 24 is larger than the diameter of the positioning holes 12 by about 0.05 mm. This allows the positioning protrusions 24 to be fitted into the positioning holes 12 through light press-fitting.

Figure 6A:
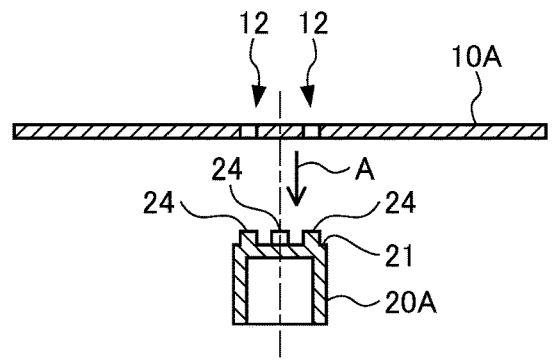
FIG. 6A is a sectional view showing part of a procedure of assembling the rotation unit in the rotary encoder according to the second embodiment.
Figure 6B:
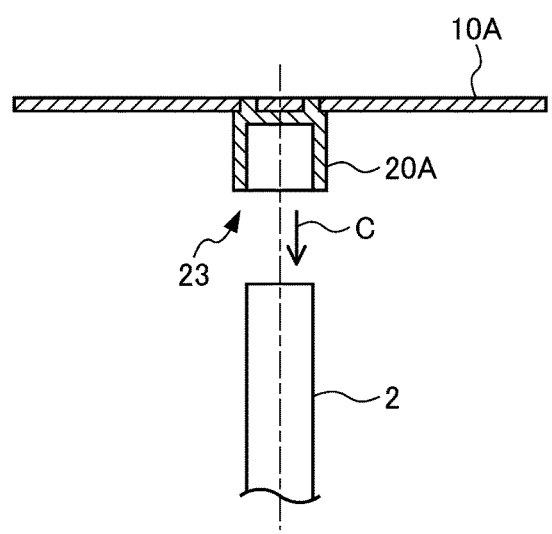
FIG. 6B is a sectional view showing different part of the procedure of assembling the rotation unit in the rotary encoder according to the second embodiment.

A procedure of assembling the rotation unit (including the rotation code plate 10A and the boss 20A) in the rotary encoder 1A will be described next by referring to FIGS. 6A and 6B. FIGS. 6A and 6B are sectional views showing the procedure of assembling the rotation unit in the rotary encoder 1A according to the second embodiment.

First, the boss 20A is attached to the rotation code plate 10A. More specifically, as shown in FIG. 6A, the positioning protrusions 24 of the boss 20A are fitted into the positioning holes 12 at the rotation code plate 10A through light press-fitting (arrow A). At this time, the rotation code plate 10A and the boss 20A may be adhesively connected with an adhesive member. If the rotation code plate 10A and the boss 20A are not connected adhesively with an adhesive member, deformation (plane deformation, for example) of the rotation code plate 10A resulting from shrinkage of an adhesive member caused during curing of the adhesive member can be avoided.

Next, like in the procedure described above by referring to FIG. 3B, the rotation code plate 10A and the boss 20A are attached to the shaft 2. More specifically, as shown in FIG. 6B, the shaft 2 is fitted into the fitting hole 23 at the boss 20A through light press-fitting (arrow C).

Like in the above-described rotary encoder 1 of the first embodiment, in the rotary encoder 1A of the second embodiment, the need for performing the second centering step for reducing decentering of the rotation center of the boss 20A (specifically, the rotation center of the detection code 11 at the rotation code plate 10A) relative to the rotation center of the shaft 2 can be eliminated during attachment of the boss 20A to the shaft 2.

Additionally, in the rotary encoder 1A of the second embodiment, the rotation code plate 10A includes the positioning holes (first positioning holes) 12 formed at positions determined relative to the rotation center of the rotation code plate 10A. Further, the boss 20A includes the positioning protrusions (second positioning protrusion) 24 formed at positions determined relative to the rotation center of the boss 20A for making fits with the positioning holes 12 through light press-fitting. Thus, decentering of the rotation center of the detection code 11 at the rotation code plate 10A relative to the rotation center of the boss 20A can be reduced only by fitting the positioning protrusions 24 of the boss 20A into the positioning holes 12 at the rotation code plate 10A through light press-fitting. This makes it possible to eliminate the need for performing the first centering step for reducing decentering of the rotation center of the detection code 11 at the rotation code plate 10A relative to the rotation center of the boss 20A during attachment of the boss 20A to the rotation code plate 10A.

Modifications of Second Embodiment

In the above-described second embodiment, the rotation code plate 10A includes the four positioning holes 12, and the boss 20A includes the four positioning protrusions 24. However, this is not the only case. The rotation code plate 10A may include one or multiple positioning holes 12 formed to correspond to the rotation center of the rotation code plate 10A. Further, the boss 20A may include one or multiple positioning protrusions 24 formed to correspond to the rotation center of the boss 20A.

Figure 5B:
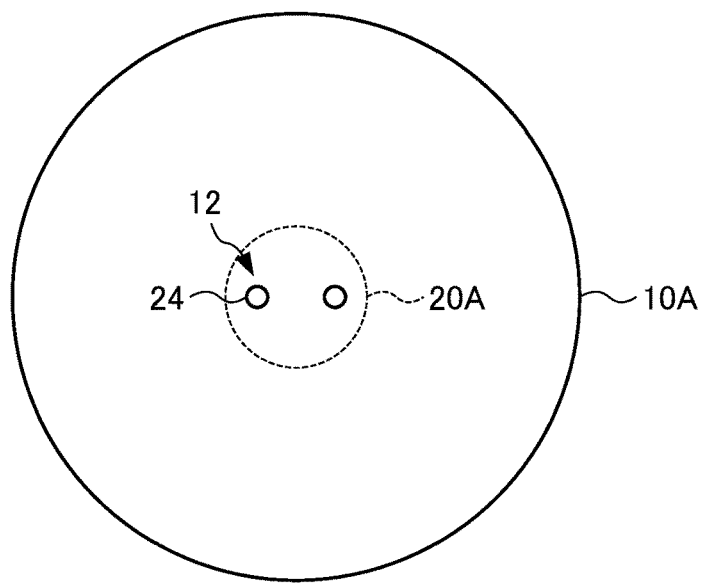
FIG. 5B shows a rotation unit in a rotary encoder according to a modification of the second embodiment viewed from the direction of the rotation code plate.

As shown in FIG. 5B, for example, the rotation code plate 10A may include two positioning holes 12 corresponding to the rotation center of the rotation code plate 10A. Further, the boss 20A may include two positioning protrusions 24 corresponding to the rotation center of the boss 20A.

Figure 5C:
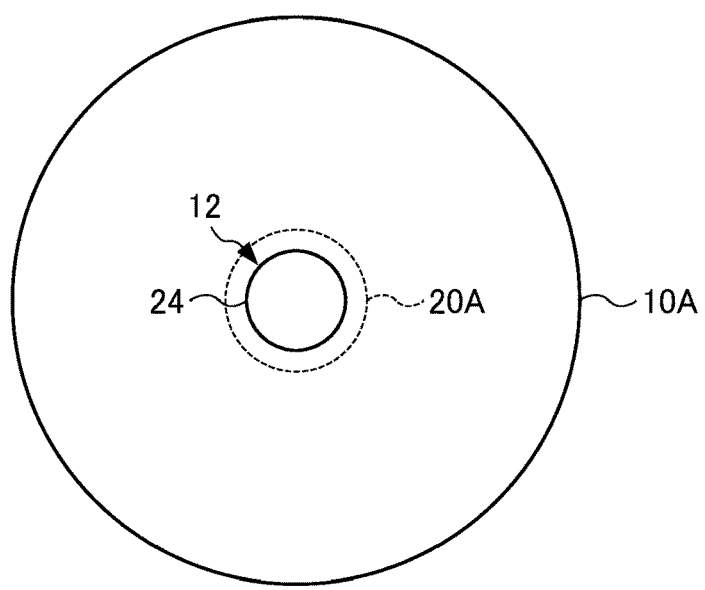
FIG. 5C shows a rotation unit in a rotary encoder according to a different modification of the second embodiment viewed from the direction of the rotation code plate.

As shown in FIG. 5C, the rotation code plate 10A may include one positioning hole 12 corresponding to the rotation center of the rotation code plate 10A. Further, the boss 20A may include one positioning protrusion 24 corresponding to the rotation center of the boss 20A.

Third Modification

In the second embodiment, the first centering step is eliminated by press-fitting the positioning protrusion 24 of the boss 20A lightly into the positioning hole 12 at the rotation code plate 10A. In a third embodiment, the first centering step is eliminated by using an alignment member.

Referring to FIG. 1, the third embodiment differs from the first embodiment in that a rotary encoder 1B according to the third embodiment includes a rotation code plate 10B and a boss 20B instead of the rotation code plate 10 and the boss 20 in the rotary encoder 1.

Figure 7:
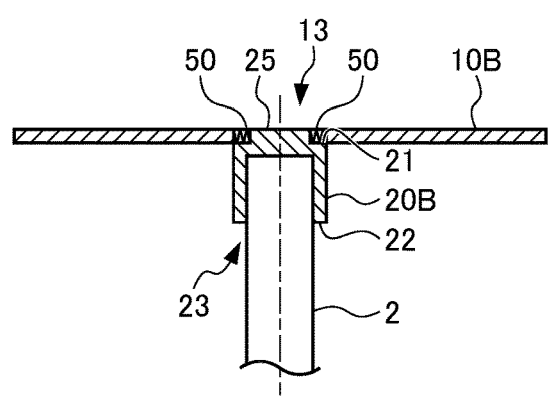
FIG. 7 is a sectional view taken along the line II-II of FIG. 1 and showing a rotation unit in a rotary encoder according to a third embodiment.
Figure 8A:
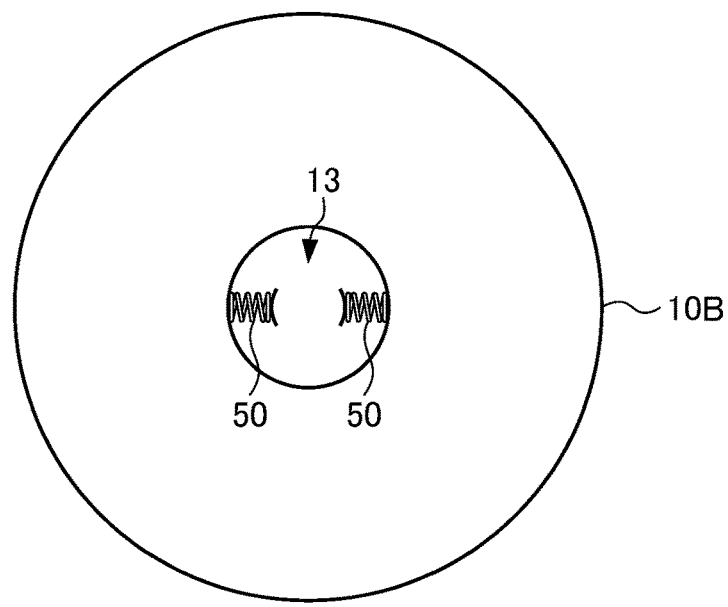
FIG. 8A shows a rotation code plate and a plate spring at the rotation unit in the rotary encoder according to the third embodiment viewed from the direction of the rotation code plate.
Figure 8B:
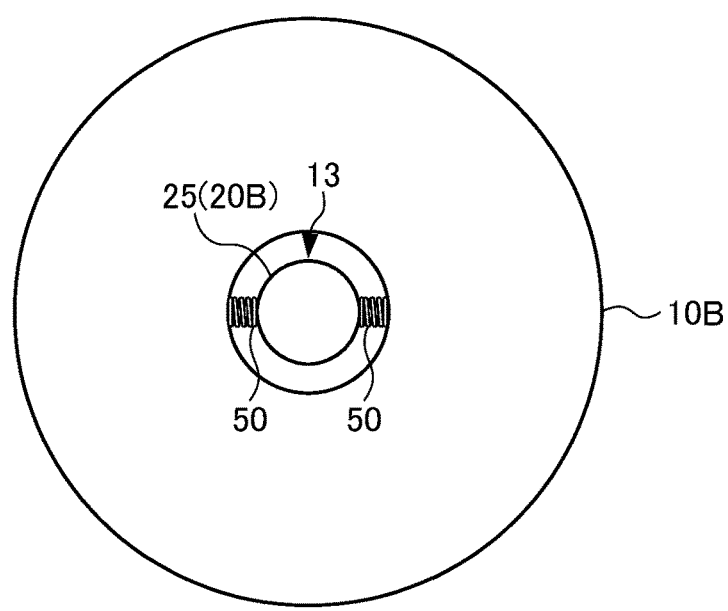
FIG. 8B shows the rotation code plate, a boss, and the plate spring at the rotation unit in the rotary encoder according to the third embodiment viewed from the direction of the rotation code plate.

FIG. 7 is a sectional views taken along the line II-II of FIG. 1 and shows a rotation unit (including the rotation code plate 10B, the boss 20B, and a plate spring 50) in the rotary encoder 1B according to the third embodiment. FIG. 8A shows the rotation code plate 10B and the plate spring 50 at the rotation unit in the rotary encoder 1B according to the third embodiment viewed from the direction of the rotation code plate 10B. FIG. 8B shows the rotation unit (including the rotation code plate 10B, the boss 20B, and the plate spring 50) in the rotary encoder 1B according to the third embodiment viewed from the direction of the rotation code plate 10B. As shown in FIGS. 7, 8A, and 8B, the rotary encoder 1B further includes two plate springs (alignment members) 50.

The rotation code plate 10B differs from the rotation code plate 10 of the first embodiment shown in FIG. 2 in that the rotation code plate 10B includes a center hole (first center hole) 13 formed at the rotation center of the rotation code plate 10B. The rotation center of the center hole 13 substantially agrees with the rotation center of the rotation code plate 10B, specifically, the rotation center of the detection code 11.

The boss 20B differs from the boss 20 of the first embodiment shown in FIG. 2 in that the one end 21 of the boss 20B is provided with a center protrusion (second center protrusion) 25 formed at the rotation center of the boss 20B for insertion into the center hole 13 at the rotation code plate 10B. The rotation center of the center protrusion 25 substantially agrees with the rotation center of the boss 20B, specifically, the rotation center of the fitting hole 23. The center protrusion 25 has a diameter smaller than the diameter of the center hole 13.

As shown in FIGS. 8A and 8B, the plate springs 50 are attached to positions in the center hole 13 at the rotation code plate 10B and between the rotation code plate 10B and the center protrusion 25 of the boss 20B. The plate springs 50 elastically deform in the radial direction of the rotation code plate 10B to align the rotation center of the rotation code plate 10B and the rotation center of the boss 20B. The rotary encoder 1B may include two or more plate springs 50.

Figure 9A:
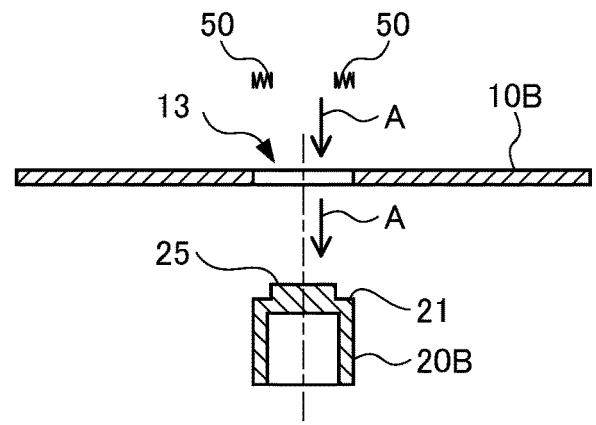
FIG. 9A is a sectional view showing part of a procedure of assembling the rotation unit in the rotary encoder according to the third embodiment.
Figure 9B:
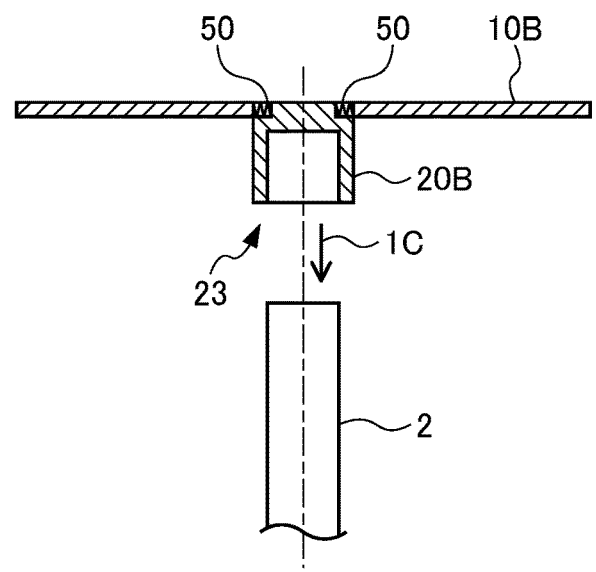
FIG. 9B is a sectional view showing a different part of the procedure of assembling the rotation unit in the rotary encoder according to the third embodiment.

A procedure of assembling the rotation unit (including the rotation code plate 10B, the boss 20B, and the plate springs 50) in the rotary encoder 1B will be described next by referring to FIGS. 9A and 9B. FIGS. 9A and 9B are sectional views showing the procedure of assembling the rotation unit in the rotary encoder 1B according to the third embodiment.

First, the boss 20B is attached to the rotation code plate 10B. More specifically, as shown in FIG. 9A, the plate springs 50 are fixed to the center hole 13 at the rotation code plate 10B with an adhesive member (arrow A). Next, the center protrusion 25 of the boss 20B is inserted between the plate springs 50 in the center hole 13 at the rotation code plate 10B (arrow A). At this time, the plate springs 50 and the boss 20B may be adhesively connected with an adhesive member. Further, the rotation code plate 10B and the boss 20B may be adhesively connected with an adhesive member.

The plate springs 50 may be fixed to the center protrusion 25 of the boss 20B with an adhesive member. Then, the center protrusion 25 of the boss 20B and the plate springs 50 may be inserted into the center hole 13 at the rotation code plate 10B.

Next, like in the procedure described above by referring to FIG. 3B, the rotation code plate 10B and the boss 20B are attached to the shaft 2. More specifically, as shown in FIG. 9B, the shaft 2 is fitted into the fitting hole 23 at the boss 20B through light press-fitting (arrow C).

Like in the above-described rotary encoder 1 of the first embodiment, in the rotary encoder 1B of the third embodiment, the need for performing the second centering step for reducing decentering of the rotation center of the boss 20B (specifically, the rotation center of the detection code 11 at the rotation code plate 10B) relative to the rotation center of the shaft 2 can be eliminated during attachment of the boss 20B to the shaft 2.

Additionally, the rotary encoder 1B of the third embodiment includes the plate springs (alignment members) 50 provided in the center hole (first center hole) 13 at the rotation code plate 10B and between the rotation code plate 10B and the center protrusion (second center protrusion) 25 of the boss 20B. Thus, decentering of the rotation center of the detection code 11 at the rotation code plate 10B relative to the rotation center of the boss 20B can be reduced only by inserting the center protrusion 25 of the boss 20B into the center hole 13 at the rotation code plate 10B through the plate springs 50. This makes it possible to eliminate the need for performing the first centering step for reducing decentering of the rotation center of the detection code 11 at the rotation code plate 10B relative to the rotation center of the boss 20B during attachment of the boss 20B to the rotation code plate 10B.

Modifications of Third Embodiment

Figure 10A:
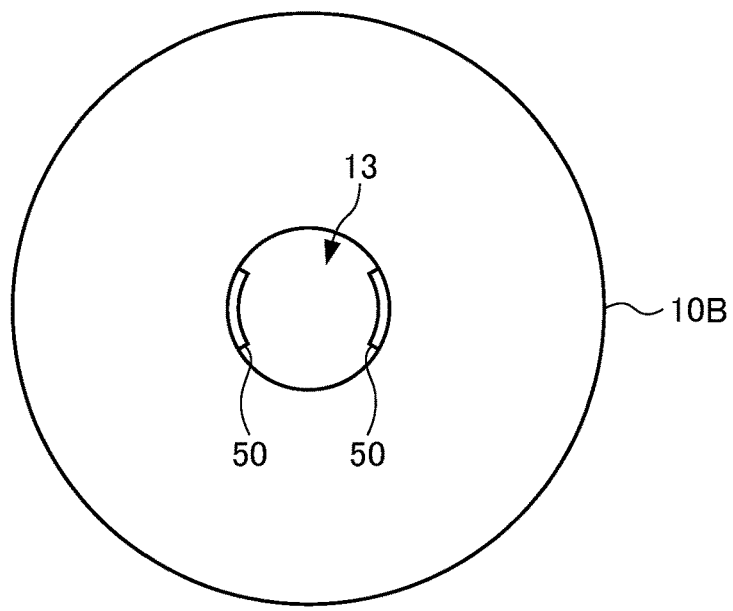
FIG. 10A shows a rotation code plate and a plate spring at a rotation unit in a rotary encoder according to a modification of the third embodiment viewed from the direction of the rotation code plate.
Figure 10B:
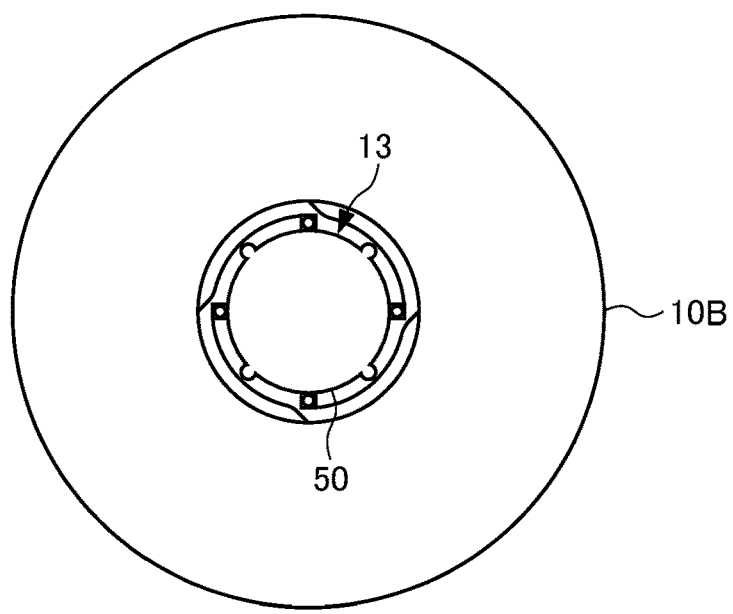
FIG. 10B shows a rotation code plate and a plate spring at a rotation unit in a rotary encoder according to a different modification of the third embodiment viewed from the direction of the rotation code plate.

In the above-described third embodiment, the plate spring 50 for alignment between the rotation center of the rotation code plate 10B and the rotation center of the boss 20B is provided as a member separated from the rotation code plate 10B and is connected adhesively to the rotation code plate 10B. However, this is not the only case of the plate spring 50. As shown in each of FIGS. 10A and 10B, for example, the plate spring 50 may be formed integrally with the rotation code plate 10B. The rotation code plate 10B and the plate spring 50 in such integrated configurations can be formed by a technique such as electroforming or etching, for example.

The present invention is not limited to the above-described embodiments. The effects described in the embodiments are merely a list of most preferred effects resulting from the present invention. Effects achieved by the present invention are not limited to those described in the embodiments.

For example, the transmissive optical rotary encoder 1, 1A, or 1B is shown as an example in each of the above-described embodiments. However, this does not limit the present invention. The features of the present invention are further applicable to a reflective optical rotary encoder, for example. The features of the present invention are also applicable to a magnetic rotary encoder.

In the exemplary case of each of the above-described embodiments, the shaft 2 is fitted into the fitting hole 23 at the boss 20, 20A, or 20B through light press-fitting. However, this does not limit the present invention. For example, the shaft 2 may be fitted into the fitting hole 23 at the boss 20, 20A, or 20B through forcible press-fitting. This may be achieved by reducing the diameter of the fitting hole 23.

Likewise, in the exemplary case of the above-described second embodiment, the positioning protrusion 24 of the boss 20A is fitted into the positioning hole 12 at the rotation code plate 10A through light press-fitting. However, this does not limit the present invention. For example, the positioning protrusion 24 of the boss 20A may be fitted into the positioning hole 12 at the rotation code plate 10A through forcible press-fitting. This may be achieved by increasing the diameter of the positioning protrusion 24 or by reducing the diameter of the positioning hole 12.

In the exemplary case of the above-described second embodiment, the positioning hole (first positioning hole) 12 is formed at the rotation code plate 10A and the positioning protrusion (second positioning protrusion) 24 is formed at the boss 20A. Alternatively, the positioning hole 12 at the rotation code plate 10A may be replaced by a positioning protrusion (first positioning protrusion). Further, the positioning protrusion 24 at the boss 20A may be replaced by a positioning hole (second positioning hole). If the rotation code plate 10A is made of glass or resin, for example, a protrusion can be formed at the rotation code plate 10A. In this case, the positioning hole (second positioning hole) at the boss 20A may have a diameter smaller than the diameter of the positioning protrusion (first positioning protrusion) at the rotation code plate 10A. In this case, the positioning protrusion (first positioning protrusion) can be fitted into the positioning hole (second positioning hole) through press-fitting.

In the exemplary case of the above-described third embodiment, the center hole (first center hole) 13 is formed at the rotation code plate 10B and the center protrusion (second center protrusion) 25 is formed at the boss 20B. Alternatively, the center hole 13 at the rotation code plate 10B may be replaced by a center protrusion (first center protrusion). Further, the center protrusion 25 at the boss 20B may be replaced by a center hole (second center hole). If the rotation code plate 10B is made of glass or resin, for example, a protrusion can be formed at the rotation code plate 10B.

EXPLANATION OF REFERENCE NUMERALS 1, 1A, 1B Rotary encoder
2 Shaft (rotation
10, 10A, 10B Rotation code plate (rotation unit)
11 Detection code
12 Positioning hole (first positioning hole)
13 Center hole (first center hole)
20, 20A, 20B Boss (rotation unit)
21 One end
22 Opposite end
23 Fitting hole
24 Positioning protrusion (second positioning protrusion)
25 Center protrusion (second center protrusion)
30 Light-emitting unit
40 Light-sensitive unit
50 Plate spring (alignment member) (rotation unit)

What is claimed is:

1. A rotary encoder for detecting the rotation position or rotation speed of a shaft, comprising:
 a rotation code plate having a detection code and to be rotated by the shaft; and
 a boss attached to the rotation center of the rotation code plate and used for attaching the rotation code plate to the shaft, wherein
 the rotation code plate includes a first positioning hole or a first positioning protrusion formed at a position determined relative to the rotation center of the detection code at the rotation code plate,
 the boss is made of a resin material,
 the boss includes a fitting hole formed at the rotation center of the boss and used for making a fit with the shaft through press-fitting, and
 the boss includes a second positioning protrusion or a second positioning hole formed at a position determined relative to the rotation center of the boss, the second positioning protrusion being used for making a fit with the first positioning hole through press-fitting, the second positioning hole being used for making a fit with the first positioning protrusion through press-fitting.

2. A rotary encoder for detecting the rotation position or rotation speed of a shaft, comprising:
 a rotation code plate having a detection code and to be rotated by the shaft; and
 a boss attached to the rotation center of the rotation code plate and used for attaching the rotation code plate to the shaft, wherein
 the rotation code plate includes a first center hole or a first center protrusion formed at the rotation center of the detection code at the rotation code plate,
 the boss is made of a resin material,
 the boss includes a fitting hole formed at the rotation center of the boss and used for making a fit with the shaft through press-fitting,
 the boss includes a second center protrusion to be inserted into the first center hole or a second center hole into which the first center protrusion is to be inserted, the second center protrusion and the second center hole being formed at the rotation center of the boss, and
 the rotary encoder further comprises an alignment member formed in the first center hole and between the rotation code plate and the second center protrusion of the boss or formed in the second center hole and between the first center protrusion of the rotation code plate and the boss, the alignment member being used for aligning the rotation code plate and the boss.

3. The rotary encoder according to claim 1, wherein the fitting hole has a diameter smaller than the diameter of the shaft.

4. The rotary encoder according to claim 1, wherein the second positioning protrusion has a diameter larger than the diameter of the first positioning hole, and
 the second positioning hole has a diameter smaller than the diameter of the first positioning protrusion.

* * * * *